United States Patent [19]

Severin

[11] Patent Number: 4,609,816

[45] Date of Patent: Sep. 2, 1986

[54] POSITION SENSOR HAVING AT LEAST TWO LAYERS OF LIGHT CONDUCTORS

[75] Inventor: Petrus J. W. Severin, Eindhoven, Netherlands

[73] Assignee: U.S. Philips Corporation, New York, N.Y.

[21] Appl. No.: 597,762

[22] Filed: Apr. 6, 1984

[30] Foreign Application Priority Data

Apr. 14, 1983 [NL] Netherlands ............... 8301298

[51] Int. Cl.$^4$ ............................................. H01J 5/16
[52] U.S. Cl. ................... 250/227; 250/231 R; 340/365 P
[58] Field of Search .............. 73/705; 250/227, 231 P; 340/365 P; 350/96.15, 96.29

[56] References Cited

U.S. PATENT DOCUMENTS 4,480,182 10/1984 Ely et al. ............................ 250/227
4,486,095 12/1984 Mitchelson ..................... 250/227 X

FOREIGN PATENT DOCUMENTS 0021279 2/1981 Japan ................................. 250/227
0711518 1/1980 U.S.S.R. ........................ 350/96.15

Primary Examiner—Eugene R. LaRoche
Assistant Examiner—James C. Lee
Attorney, Agent, or Firm—Jack E. Haken; James J. Cannon, Jr.

[57] ABSTRACT

The force-sensitive position sensor or writing tablet is composed (for each of the two coordinate directions) of two layers of parallel extending light conductors having a spacing of 0.1 mm or less, the distance between the two layers being approximately 5 µm. By locally exerting a force on the carrier material in which the light conductors are embedded, by means of the tip of a stylus, the light conductors are geometrically deformed. These deformations cause a variation of the optical coupling between the two locally deformed conductors, thus causing a detectable transfer of light variation from one conductor to the other. By connection of one layer to a light source and the other layer to a suitable detector, a force-sensitive position sensor can be constructed by means of electro-optical means.

6 Claims, 7 Drawing Figures

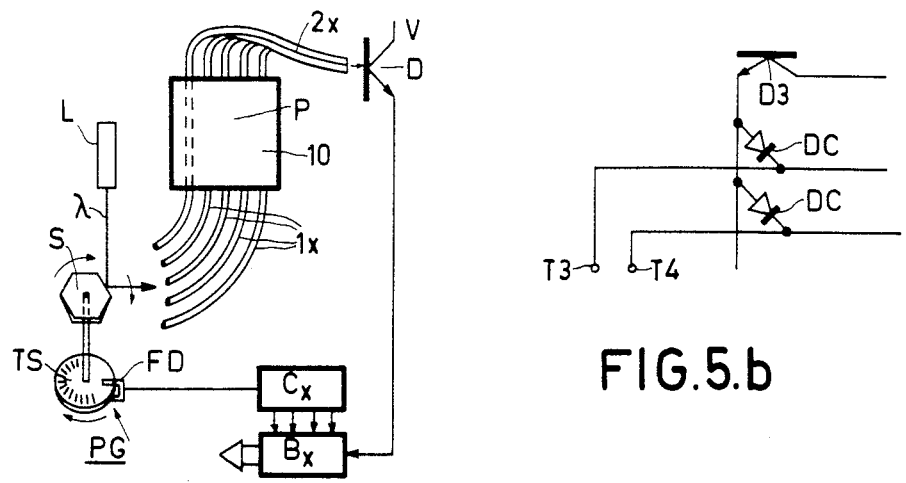
FIG.3
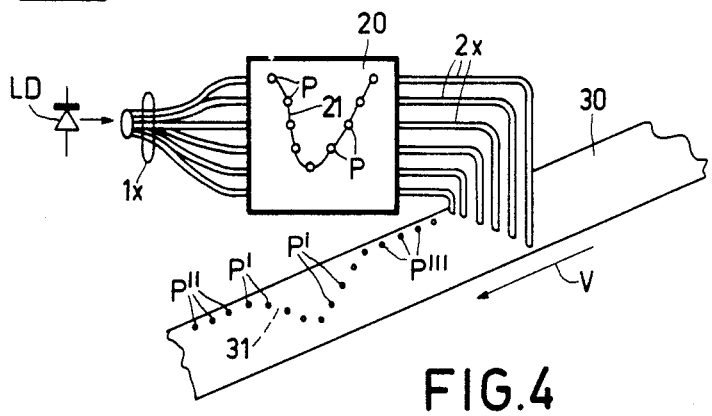
FIG.5.b
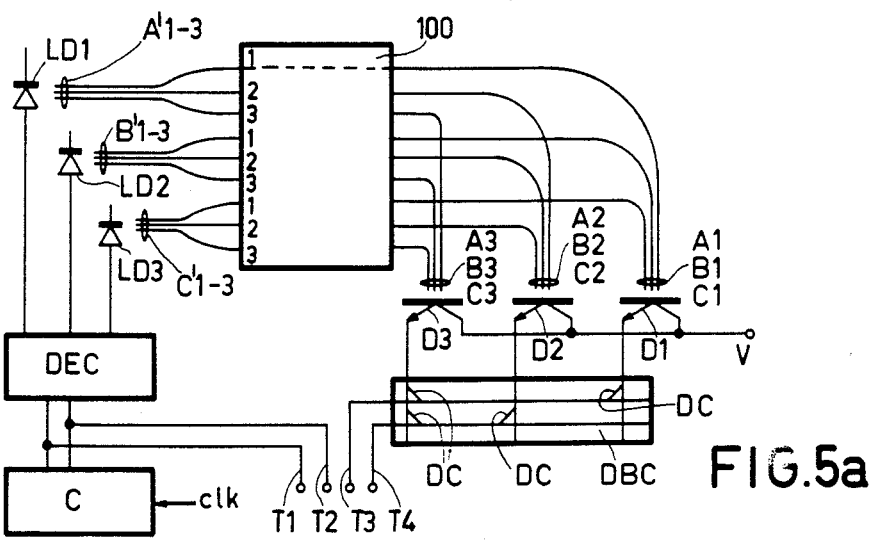
FIG.4
FIG.5a

POSITION SENSOR HAVING AT LEAST TWO LAYERS OF LIGHT CONDUCTORS

BACKGROUND OF THE INVENTION

1. Field of the Invention

The invention relates to a position sensor for forming, using optical means, an electric signal which is dependent on the position of an end of a pointing member which bears on the position sensor.

2. Description of the Prior Art

A position sensor of this kind is known from a publication by S. Tamura et al in Applied Optics, Vol. 19, No. 11, June 1, 1980. The described sensor is formed by a rectangular flat plate which is surrounded by oppositely situated rows of light-emitting and detecting diodes. An end of a pointing member, for example, a stylus positioned on the flat plate "interrupts" the light which is emitted by the rows of diodes in a given sequence and which is detected more or less by the oppositely situated diodes. Each photodiode should be connected to a so-called coherent detection circuit; consequently, a sizable position sensor offering a suitable resolution is an expensive device. Furthermore, the resolution and the absolute size of the position sensor are restricted by the low directional sensitivity of the photodiodes and also by the minimum signal-to-noise ratio required.

SUMMARY OF THE INVENTION

It is an object of the invention to provide a position sensor which allows for a comparatively high resolution in a large surface area to be chosen. It is a further object of the invention to provide a position sensor whose electronic circuits are very simple and limited in size.

To this end, a position sensor in accordance with the invention is characterized in that it comprises at least two layers of light conductors which are embedded in a light-conducting carrier material whose refractive index is lower than the refractive index of the light conductors, the light conductors in both layers extending parallel to one another, the spacing of the light conductors in each layer being larger than the distance between two light conductors which are substantially oppositely situated in the two layers, the light conductors in a first layer being connected to a light source while the light conductors in the second layer are connected to a light detector. In the force-sensitive position sensor a position of a tip of a writing tool is determined by the occurrence of light transfer between two light conductors. It follows therefrom that a very high resolution can be achieved by using very thin light conductors (diameter in the order of magnitude of a few $\mu m$), and that the position of the tip of the writing tool is determined by detection of the light transfer between two of such light conductors.

BRIEF DESCRIPTION OF THE DRAWINGS

The invention will be described in detail hereinafter with reference to a number of embodiments which are shown in the drawing; therein:

FIG. 4 shows an optomechanical position encoding device, and FIGS. 5a and b show an optoelectronic position decoding circuit for a position sensor in accordance with the invention, as well as a detail thereof.

DESCRIPTION OF THE PREFERRED EMBODIMENTS

Figure 1:
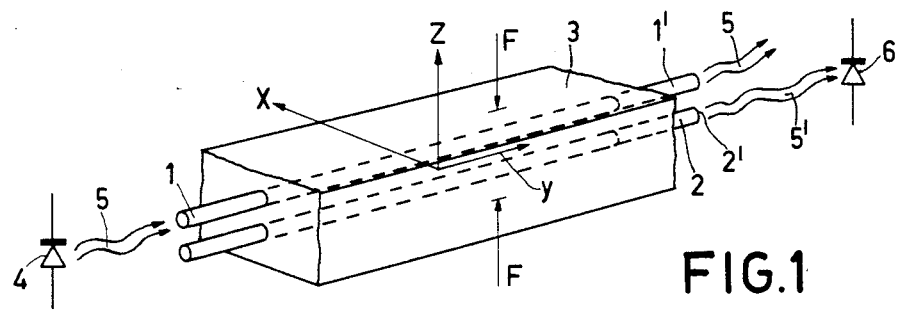
FIG. 1 shows the principle used in the position sensor in accordance with the invention, FIGS. 2a and b diagrammatically show the construction of the position sensor in accordance with the invention, FIG. 3 diagrammatically shows an opto-mechanical position decoding device for a writing tablet in accordance with the invention.

FIG. 1 shows two glass or plastic light conductors 1 and 2 which extend in the y-direction of a cartesian system of coordinates x-y-z. The light conductors 1 and 2 are embedded in a carrier 3 of a transparent material and are situated one over the other at a distance of approximately from 5 to 10 $\mu m$, viewed in the z-direction. The conductors 1 and 2 themselves have a diameter of from 3 to 5 $\mu m$. All dimensions are given by way of example and are, of course, dependent on the wavelength of the light used. The refractive index of the light conductors 1 and 2 is slightly higher ($\leq 1\%$) than that of the material of the carrier 3 surrounding the light conductors 1 and 2. Light 5 is radiated into the light conductor 1 by a diode 4. In normal circumstances the light 5 will travel through the light conductor 1 in order to emerge therefrom at the end 1' thereof. When a force F is exerted on the carrier 3 so that actually a local geometrical deformation occurs, the optical coupling between the light conductors 1 and 2 will change and the part of the light which propagates outside the conductor 1 will also change; part thereof will then propagate in the conductor 2. The light 5' which emerges from an end 2' of the light conductor 2 will be detected by a photosensitive diode 6. The degree of optical coupling between the light conductors 1 and 2 depends in a complex manner on the light conductor configuration, dimensions, such as spacing, refractive index, refractive index profile, wavelength $\lambda$ of the light used, etc. A model of the phenomenon "perturbation of wave propagation" and its dependence on said parameters has already been described in Philips Journal of Research, Vol. 33, No. 5/6, 1978, pages 254-263, by D. Tjaden.

When, viewed in the x-direction, pairs of light conductors are adjacently arranged in such a carrier 3 arranged over one another in the z-direction and extending in the y-direction) at a distance $\Delta x (\approx 100\ \mu m)$ which is large with respect to the distance in the z-direction ($\Delta z \approx 5-10\ \mu m$) an x-position sensor is obtained which (viewed in the x-direction) produces, at the area where a force F is exerted on the carrier 3, a light signal on an "outgoing" light conductor 2 when light is radiated into the associated light conductor 1. The carrier 3 first of all serves to maintain the light conductors 1 and 2 at the correct distance from one another so that light can be transferred therebetween, and also serves for mechanical protection of the light conductors.

Figure 2A:
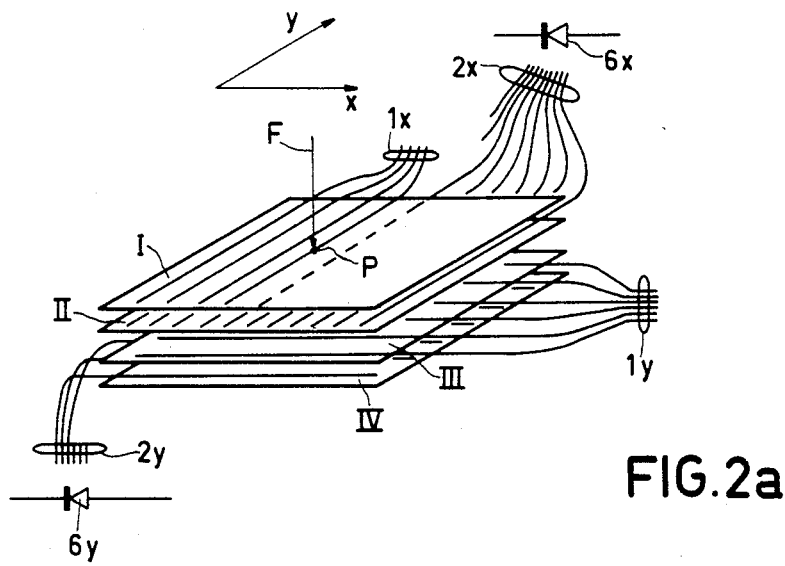

FIG. 2a diagrammatically shows the construction of a position sensor. In a first layer I a row of light conductors which extend in the y-direction is arranged in the x-direction. In a layer II there is arranged a second row of light conductors which extend parallel to the light conductors in the first layer I. Each light conductor in the layer I is situated exactly over (viewed in the z-direction) a light conductor in the layer II as appears also from FIG. 1. The layers III and IV in FIG. 2a are identical to the layers I and II with the exception of the direction (x-direction). The light conductors in the layers III and IV are directed at right angles to the light conductors in the layers I and II. If necessary, the spacing of the light conductors in the layers III and IV differs from that in the layers I and II. The ends of the light-conductors 2x of the layer II are bundled and fed to a photodiode 6x. Similarly, the ends of the light conductors 2y of the layer IV are bundled and fed to a photodiode 6y. The ends of the lght conductors 1x and 1y of the layers I and III, respectively, however, are adjacently arranged in a row in the correct sequence. When a force F is exerted on the stack of the four layers I to IV in a point p, the diodes 6x and/or 6y detect, when the light conductors 1x and 1y are alternately irradiated, a light signal emerging from the light conductors 2x and 2y if those light conductors 1x and/or 1y are irradiated which extend exactly underneath the point p or which are situated sufficiently near this point. It will be apparent that such a position sensor allows for a high resolution ($\geq 10$ lines/mm) and that it is very suitable as a writing or drawing tablet, because the light conductors allow for such a spacing and the tip of customary writing tools (for example, a ballpoint) exerts a force on a surface which has a diameter in the same order of magnitude.

Figure 2B:
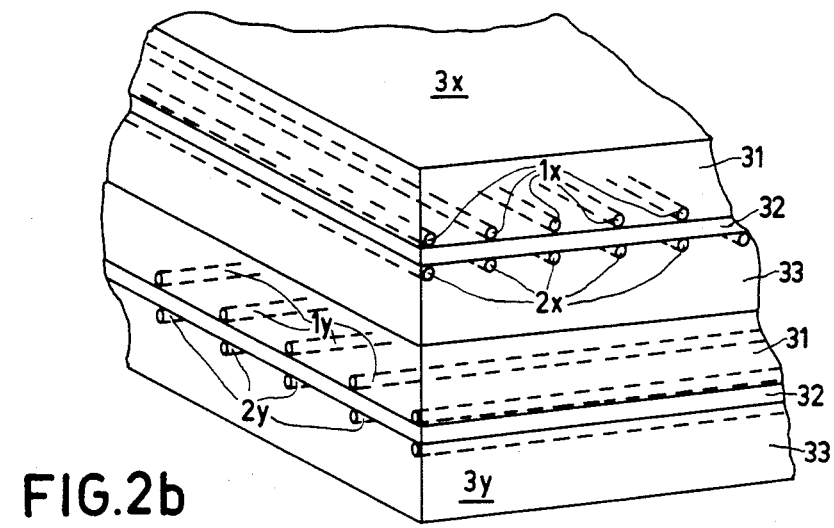

FIG. 2b is a diagrammatic sectional view (not to scale) of the layer-wise composition of the position sensor or the writing tablet shown in FIG. 2a. The thickness of the carriers 3x and 3y in which the layers I and II, III and IV, respectively, are situated amounts to $\approx 100$ $\mu$m. Each of the carriers 3x and 3y comprises three layers: a first layer 31 and a third layer 33, each having a thickness of $\approx 50$ $\mu$m, and a second layer 32 which has a thickness of $\approx 5$ $\mu$m and which is enclosed by the first and the third layer. The conductors 1x in the layer 31 and the conductors 2x in the layer 33 are arranged at the sides of the layers 31 and 33 which adjoin the second layer 32. Similarly, the conductors 1y and 2y are arranged on both sides of the enclosed layer 32 of the carriers 3y. It is alternatively possible to form conductors in the second layer 32. Use is then made of a second layer (for example, having a thickness of 15 $\mu$m) in which light-conductive tracks are formed on both sides by means of known techniques (for example, see the book "Planar Optical Wave Guides and Fibres", Chapter 3, 1977, by H. G. Unger, published by Clarendon Press, Oxford). Because the position sensor or the writing tablet has a thickness of only a few tenths of a millimeter and because it is transparent, the sensor or the writing tablet, when made of an elastic material, can be arranged directly against a display screen of, for example a computer terminal so that direct interaction with the computer is possible.

As has already been stated, the position p of the force F exerted can be determined by irradiating the light conductors 1x and 1y one by one and by detecting the light intercepted by one of each group of light conductors 2x and 2y. When the light conductors 1x and 1y are periodically irradiated, the instant at which light is detected at an exit of the light conductors 2x and 2y within such a period will be decisive for the position p.

FIG. 3 diagrammatically shows an embodiment of a position detection mechanism of the described kind. The light conductors 1x are arranged in a row and are irradiated one by one by a light beam $\lambda$ which is reflected to the ends of the light conductors 1x via a rotating prism S. In order to know the position of the light beam $\lambda$ (actually the position of the irradiated light conductor), the prism S is mechanically coupled to a pulse generator PG. The pulse generator PG comprises a disc TS which rotates in synchronism with the prism S and which generates pulses in cooperation with a photodiode and a light emitting diode FD, said pulses being applied to a counter $C_x$. The position of the counter $C_x$ is a measure of the position of the prism S and hence a measure of the position of the light conductor 1x being irradiated at the relevant instant. When a force is exerted on the position sensor or the writing tablet 10 in a point p, a detection transistor D receives a light pulse via the bundled outgoing light conductors 2x if the light conductor 1x extends underneath the point p. The transistor D subsequently applies a control pulse to a buffer circuit $B_x$, with the result that the position of the counter $C_x$ is transferred to the buffer $B_x$. The buffer $B_x$ contains the counter position in which a transfer of light took place from one of the light conductors 1x to 2x, so that it indicates the position (in the x-direction). Evidently, for the determination of the y-position use can be made of a similar opto-mechanical decoding device. Instead of a rotating prism S and the pulse generator PG, use can alternatively be made of, for example a piezoelectric crystal on which a mirror is mounted in order to irradiate the row of light conductors 1x. The control voltage for the piezoelectric crystal is then a measure of the position of the light beam $\lambda$, and hence of the position of the irradiated light conductor 1x. Obviously, the entire irradiation and detection mechanism can be completely reversed, the bundled light conductors 2x then being irradiated and the light conductors 1x being sequentially sampled for the determination of the position of the pressure point p. To this end it is merely necessary to arrange the transistor D in the location of the light source L and vice versa; of course, the output of the transistor D remains connected to the control input of the buffer $B_x$.

FIG. 4 shows a further embodiment of a position decoding device for a position sensor 20 in accordance with the invention. The light conductors 1x of the first layer are bundled and are irradiated by a light-emitting diode LD. The outgoing light conductors 2x of the position sensor 20 are arranged in a row which extends transversely of a propagation direction V of a photosensitive tape 22 which travels at a speed $v$, the ends of the light conductors 2x being directed perpendicularly to the tape surface. The The light pulses emitted by the diode LD (emission frequency f) produce exposed (colored) spots on the tape 20 with a spacing $v/f$, viewed in the propagation direction V. The position of an exposed spot on the tape 22 (viewed transversely of the direction V) depends on the position P on the position sensor 20 in which a force is exerted. For the sake of clarity, on the sensor 20 there is shown a curve 21 on which there are indicated points P which produce an exposed spot P' on the tape 30 when the curve 21 is drawn on the sensor 20 by means of a writing tool. It is to be noted that, when the tip of the writing tool is held stationary during drawing, light spots are continuously written in the same position (viewed transversely of the direction V); by way of example, in FIG. 4 the writing tool has been held stationary at the beginning as well as at the end of the curve 21, thus producing the points P" and P''', respectively, on the tape 22. It will be apparent that in FIG. 4 only the x-coordinate is defined. The y-coordinate associated with each x-coordinate can be determined in a similar manner. It is useful to arrange the row of ends of the light conductors 2y in the prolongation of the row of light conductors 2x, so that the x-coordinate as well as the associated y-coordinate can thus be defined on the tap 30 on a line which extends transversely of the direction V. A tape 30 thus formed can be used for data input for computer equipment in the same way as a conventional punched type.

FIG. 5 shows a preferred embodiment of a position sensor or writing tablet 100 in accordance with the invention. Again only a one-dimensional position determination is represented; a two-dimensional position determination can be performed by doubling the components shown, the added group of components being connected to groups of light conductors which are directed transversely of the light conductors $A_{1-3}$ and $A_{1-3}'$; $B_{1-3}$ and $B_{1-3}'$ and $C_{1-3}$ and $C_{1-3}'$ shown in FIG. 5. The writing tablet 100 and the associated components do not comprise moving parts (as in the FIGS. 3 and 4) and produce digital electric output signals on outputs $T_{1-4}$ which are suitable for direct input into a computer. The incoming and outgoing light conductors $A_{1-3}'$, $B_{1-3}'$, $C_{1-3}'$ and $A_{1-3}$, $B_{1-3}$ and $C_{1-3}$, respectively, are subdivided into groups in a special way so that the number of light-emitting diodes $LD_{1-3}$ and the number of detectors $D_{1-3}$ can remain limited while a high resolution can still be achieved (for example, 1000 lines on an A-4 format ($\approx 29.7 \times 21$ cm)) in the horizontal as well as in the vertical direction. In the Figure, the nine light conductors $A_{1-3}'$, $B_{1-3}'$ and $C_{1-3}'$ to be irradiated are sub-divided into three groups of three adjacently situated light conductors. The groups of light conductors $A_{1-3}'$, $B_{1-3}'$ and $C_{1-3}'$ are alternately and periodically irradiated in a pulsed manner by means of light sources $LD_{1-3}$ which are connected to a decoding circuit DEC. The inputs of the decoding circuit DEC are connected to outputs of a binary counter C which periodically receives control pulses clk. From the relevant counter position, the circuit DEC determines which source $LD_1$, $LD_2$ or $LD_3$ (actually, which group of light conductors $A_{1-3}'$, $B_{1-3}'$ or $C_{1-3}'$) must be activated.

It will be apparent that with each light conductor $A_{1-3}'$, $B_{1-3}'$ and $C_{1-3}'$ to be irradiated there is associated an outgoing light conductor $A_{1-3}$, $B_{1-3}$ and $C_{1-3}$ which can receive light only from the associated irradiated light conductor (see FIG. 1). The outgoing light conductors $A_{1-3}$, $B_{1-3}$ and $C_{1-3}$ are also subdivided into three groups of three light conductors each; the light conductors bearing an index 1 ($A_1$, $B_1$ and $C_1$) belong to the first group, while the light conductors bearing the indices 2 and 3 ($A_2$, $B_2$, $C_2$ and $A_3$, $B_3$, $C_3$, respectively) form part of the second group and the third group, respectively. Each of these groups is connected to a detector transistor $D_1$, $D_2$ and $D_3$. When the detector transistor $D_1$ detects a light pulse after the emission of a light pulse by the light source $LD_1$, a transfer of light has taken place from a light conductor of the group A' to a light conductor of the group bearinhg the index 1. When a light pulse is detected by the detector transistor $D_2$ after the light source $LD_2$ has emitted a light pulse, a transfer of light has taken place from a light conductor of the group C' to a light conductor of the group bearing the index 2. The combination of the activation data (=the position of the counter C) of the light sources $LD_{1-3}$ and the data of the detected light pulse (detector $D_{1-3}$) defines the exact position of the light transfer (at least in a direction x for the device shown in FIG. 5a).

It is useful to have the position available in the form of a binary number (computer input). The outputs of the detector transistors $D_{1-3}$, consequently, are connected to an encoding circuit DBC which produces a binary number on output terminals $T_3$ and $T_4$, said binary number corresponding to the index number of the transistor which detects a light pulse. The connections DC in FIG. 5a are actually formed by diodes DC which are partly shown in detail in FIG. 5b. When $D_3$ is conductive, the output terminals $T_3$ and $T_4$ are "high". It will be apparent that the outputs of the counter and those of the encoding circuit DEC present a binary number which is an exact translation into a position of the transfer of light on the writing tablet 100.

The described example involving three groups of three light conductors each is merely an example. In reality, for example in each layer 32 groups of 32 light conductors are used in the x-direction as well as in the y-direction (for the A-4 format, this offers a resolution of better than $0.3 \times 0.3$ mm). For a number of $N^2 \times N^2$ positions to be detected, only 2N light sources and only 2N light detectors are required. When N equals 32 (above example), the counter C must be capable of counting up to a width of 5 bits ($T_1-T_5$) and the decoding circuit DEC should comprise two "one-out-of-sixteen" decoding circuits. The encoding circuit DEC will comprise five outgoing lines ($T_5-T_{10}$) because a translation of the number $32_{10}$ to the binary system is required. The position x will then be given as a ten-bit number ($T_1-T_{10}$) and so will a position for the y-coordinate. It is to be noted that the activation of the light sources for the x-direction as well as the y-direction can be simultaneously performed, so that a part (formed by the counter C) of the number of the x-position in a point (x, y) will be the same as a corresponding part of the number of the y-position in that point (x,y). The coordinates of the point (x, y) can, therefore, be exactly defined by means of one 15-bit word (in the above example). It is also to be noted that the frequency of the clock pulses clk is decisive for the maximum writing and drawing speed on the writing tablet for which the maximum resolution is still maintained.

What is claimed is:

1. A position sensor for forming, using optical means, an electric signal which is dependent on the position of an end of a pointing member which bears on the position sensor, said position sensor comprises at least two layers of light conductors embedded in a light-conducting carrier material whose refractive index is lower than the refractive index of the light conductors, the light conductors in both layers extending parallel to one another, the spacing of the light conductors in each layer being at least a factor of five larger than the distance between two light conductors which are substantially oppositely situated in the two layers, the light conductors in a first layer being connected to a light source while the light conductors in a second layer are connected to a light detector.

2. A position sensor as claimed in claim 1, wherein the light detector comprises several detector elements, the light conductors of a layer being subdivided into a corresponding number of groups, each of the groups of light conductors being connected to an associated detector element.

3. A position sensor as claimed in claim 2, wherein a first layer of light conductors is subdivided into a number of equally large groups of adjacently situated light conductors, said number being equal to or an integer number of times larger than the number of light conductors in each group, a second layer of light conductors being subdivided into the same number of groups, a first group of the second layer being composed of the light conductors which are situated opposite a first light conductor of each group of the first layer, an $n^{th}$ group of the second layer being composed of the light conductors which are situated opposite the $n^{th}$ light conductors of each group of the first layer, where 1 is smaller than or equal to N, N being the number of light conductors of a group of the first layer.

4. A position sensor as claimed in claim 2, wherein each group of light conductors is connected, together with a corresponding group of light conductors in a different layer, to the same light source.

5. A writing table comprising an input surface on which there is located a position sensor for forming, using optical means, an electric signal which is dependent on the position of an end of a pointing member which bears on the input surface, said position sensor comprises at least two layers of light conductors which are embedded in a light-conducting carrier material whose refractive index is lower than the refractive index of the light conductors, the light conductors in two layer extending parallel to one another, the spacing of the light conductors in each layer being at least a factor of five larger than the distance between two light conductors which are substantially oppositely situated in two adjacent layers, the light conductors in a first layer being connected to a light source while the light conductors in a second layer are connected to a light detector.

6. A display device comprising a display field adjacent of which there is located a position sensor for forming, using optical means, an electric signal which is dependent on the position of an end of a pointing member which bears on the display field, said position sensor comprises at least two layers of light conductors which are embedded in a light-conducting carrier material whose refractive index is lower than the refractive index of the light conductors, the light conductors in two layers extending parallel to one another, the spacing of the light conductors in each layer being at least a factor of five larger than the distance between two light conductors which are substantially oppositely situated in two layers, the light conductors in a first layer being connected to a light source while the light conductors in a second layer are connected to a light detector.

* * * * *